US008556338B1

(12) United States Patent
Gore et al.

(10) Patent No.: US 8,556,338 B1
(45) Date of Patent: Oct. 15, 2013

(54) PROTECTIVE COVER FOR VEHICLE SEAT BACK

(76) Inventors: Kari Gore, Sackets Harbor, NY (US); Casey Gore, Sackets Harbor, NY (US)

( * ) Notice: Subject to any disclaimer, the term of this patent is extended or adjusted under 35 U.S.C. 154(b) by 250 days.

(21) Appl. No.: 12/781,930

(22) Filed: May 18, 2010

(51) Int. Cl.
*B60N 2/60* (2006.01)

(52) U.S. Cl.
USPC ........................................ 297/188.06; 297/182

(58) Field of Classification Search
USPC .......... 297/184.1, 188.04, 188.06, 219.1, 182
See application file for complete search history.

(56) References Cited

U.S. PATENT DOCUMENTS

| | | | |
|---|---|---|---|
| 1,295,662 A | | 2/1919 | Witham, Jr. |
| 2,767,895 A * | | 10/1956 | Smith ........................... 224/275 |
| 3,014,759 A * | | 12/1961 | Bing ........................ 297/188.06 |
| 4,458,738 A | | 7/1984 | Wilson |
| D292,347 S * | | 10/1987 | Scott-Smith ................. D12/416 |
| D312,349 S * | | 11/1990 | Pogue .......................... D12/416 |
| 5,330,251 A | | 7/1994 | McGuire |
| 5,362,153 A * | | 11/1994 | Lu ................................... 383/38 |
| 5,707,107 A | | 1/1998 | Melone |
| 5,785,381 A | | 7/1998 | Carter |
| 6,006,462 A * | | 12/1999 | Lackomar ....................... 40/593 |
| 6,216,927 B1 * | | 4/2001 | Meritt ...................... 297/188.06 |
| 6,405,909 B1 * | | 6/2002 | Burnett et al. ................. 224/275 |
| 6,763,986 B2 * | | 7/2004 | Santos et al. .................. 224/585 |
| 6,817,664 B1 | | 11/2004 | Tang et al. |
| 7,066,535 B2 | | 6/2006 | Moses |
| 7,168,760 B2 | | 1/2007 | Kenny |
| D540,099 S | | 4/2007 | Tucker et al. |
| 7,210,738 B1 | | 5/2007 | Mahaffy |
| 7,891,733 B1 * | | 2/2011 | Clarke ..................... 297/188.06 |

OTHER PUBLICATIONS

Car Seat Back Protector. Top of the Line Motoring and Travel Accessories. http://www.topoftheline-travel.com/car-seat-back-protector.html. Accessed Jun. 18, 2009.
Kick Guards at AutoSport Catalog. AutoSport Automotive Outfitters. http://www.autosportcatalog.com/auto-accessories/kick-guards-3.shtml. Accessed Jun. 18, 2009.
Kick Guard Seat Protector: Saab Accessories, Saab Performance Parts—State of Nine. http://www.stateofnine.com/page/stateofnine/PROD/SPC116. Accessed Jun. 18, 2009.

* cited by examiner

*Primary Examiner* — Peter Brown
(74) *Attorney, Agent, or Firm* — Montgomery Patent & Design; Robert C. Montgomery

(57) ABSTRACT

A protective decorative cover for the rear surface of an automobile seat designed to protect the seat surface from scuff marks and dirt that may occur when the child puts his feet on the back of the seat comprises a polyvinyl chloride (PVC) sheet that is fastened to the rear of the seat using a nylon strap in a loop configuration across an upper portion. The strap comprises a quick-release buckle mechanism and a strap length adjustment mechanism. The flexible PVC sheet can be positioned anywhere on the seat to fit any size car. A bottom portion of the sheet is provided with two (2) nylon straps and a hook system to secure the device to the bottom of the seat.

12 Claims, 3 Drawing Sheets

PROTECTIVE COVER FOR VEHICLE SEAT BACK

RELATED APPLICATIONS

The present invention was first described in a notarized Official Record of Invention on Apr. 28, 2009, that is on file at the offices of Montgomery Patent and Design, LLC, the entire disclosures of which are incorporated herein by reference.

FIELD OF THE INVENTION

The present invention relates generally to vehicle seat protectors, and more particularly, to protective cover for automobile seat backs.

BACKGROUND OF THE INVENTION

For parents and others involved in raising children, nothing even comes close to the importance placed on ensuring the child's safety at all times, day and night. This notion is perhaps best demonstrated in the safety precautions taken while traveling in an automobile. Mandated not only by conscience, but also by law, small children are placed in safety seats at all times while traveling in an automobile. While safety seats provide the best safety for a child that technology can provide, they raise the child upward and forward, thus making it easier for them to kick their feet and reach the surface of the seat in front of them. While this kicking and tapping motion can be aggravating for others in the vehicle, it also produces physical damage in the form of scuff marks and dirt to the vehicle's interior, particularly the front seat backs. Such marks and dirt obviously require time and care to remove. Should the marks be permanent, they can negatively affect the resale value of the car at trade in time.

Various solutions have been presented to protect the seat back surface from damage caused by the shoes of small passengers located in the rear seats, however each suffers from one (1) or more disadvantage or deficiency with respect to design, function, or effectiveness. Some examples include positioning a towel or piece of card board over the seat back. These solutions are unsightly, difficult to maintain in position and typically are easily torn away by the child passenger. Other solutions include devices which hang on the back of seat; such devices typically include a flexible sheet which can be deployed from a roller attached to an upper rear surface of the seat. An example of such a device can be seen by in U.S. Pat. No. 7,210,738, issued in the name of Mahaffy. However, these devices are easy damaged by the child and can easy be moved aside leaving the seat back open to damage. Full seat covers are not always desirable and are commonly more easily damaged than the seat.

Accordingly, there exists a need for a means by which the rear seat surface in motor vehicles can be protected from dirt and scuff marks from a child's feet. The development of the present invention substantially departs from the conventional solutions and in doing so fulfills this need.

SUMMARY OF THE INVENTION

In view of the foregoing art, the inventor recognized the aforementioned inherent problems and observed the need for a novel means protect a front seat back of an automobile and thus, the object of the present invention is to solve the aforementioned disadvantages and provide for this need.

Another object of the present invention is to provide a device which is adjustable and can easily attach to all models and types of motor vehicle seats.

Another object of the present invention is to provide a device which protects vehicle surfaces from scuff marks, dirt, wetness, or other debris form children's feet.

Another object of the present invention is to provide a device which provides various colors, designs, or other aesthetic properties.

Yet another object of the present invention is to provide a device which collects large amounts of debris and liquid, thus preventing the same from reaching the carpeted floor of the vehicle.

Yet another object of the present invention is to provide a device which is securely retained to the rear surface of the vehicle seat.

Yet another object of the present invention is to provide a device which is simple and intuitive to use with little to no training.

Yet another object of the present invention is to provide a device which is durable and economical to manufacture.

One (1) or more of these and other objects of the invention are achieved by a protective cover for an automobile seat back comprising a generally rectangular base made of a flexible and waterproof material to protect a rear surface of a vehicle seat. A decorative binding material made of a fabric is affixed around a perimeter of the base to protect the exterior edges. An upper securing strap is affixed to upper corners of the base to connect to the vehicle seat. The upper securing strap includes a first strap section having a fixed end attached to one upper corner of the base and a second strap section having a fixed end attached to an opposing upper corner of the base. A quick release buckle is provided having a hollow base member on a first strap section and a releasably attached clasp on a second strap section. A length adjuster is provided to adapt the length of the first strap section as desired by the user to secure the base flush against the seat back. A pair of lower securing straps is included to connect the base to the vehicle seat. Each lower securing strap includes a third strap section having a fixed end attached to a lower corner of the base and a free end. A length adjuster is also included to adapt the length of each third strap section as desired by the user to secure the base flush against the seat back. Each free end of the third strap sections includes a hook to hookingly engage a lower portion of the vehicle seat. A pocket affixed to a lower exterior portion of the base having an open top is provided to collect debris or liquid falling from the shoes of the child.

Furthermore, the described features and advantages of the invention may be combined in various manners and embodiments as one (1) skilled in the relevant art will recognize. The invention can be practiced without one or more of the features and advantages described in a particular embodiment.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | protective cover for automobile seat back |
| 15 | cover base |
| 20 | binding material |
| 25 | upper securing strap |
| 30 | first strap section |
| 32 | second strap section |
| 35 | quick release buckle |
| 40 | first length adjuster |
| 45 | lower securing strap |
| 50 | second strap material |
| 55 | second length adjuster |
| 60 | hook |
| 65 | pocket area |
| 70 | rear surface |
| 75 | front motor vehicle seats |
| 80 | headrest area |
| 85 | seat bottom structure |
| 90 | occupant |
| 95 | rear car seat |
| 100 | downward protruding opening |
| 105 | feet |
| 110 | foreign material means |

DETAILED DESCRIPTION OF THE PREFERRED EMBODIMENT

Figure 1:
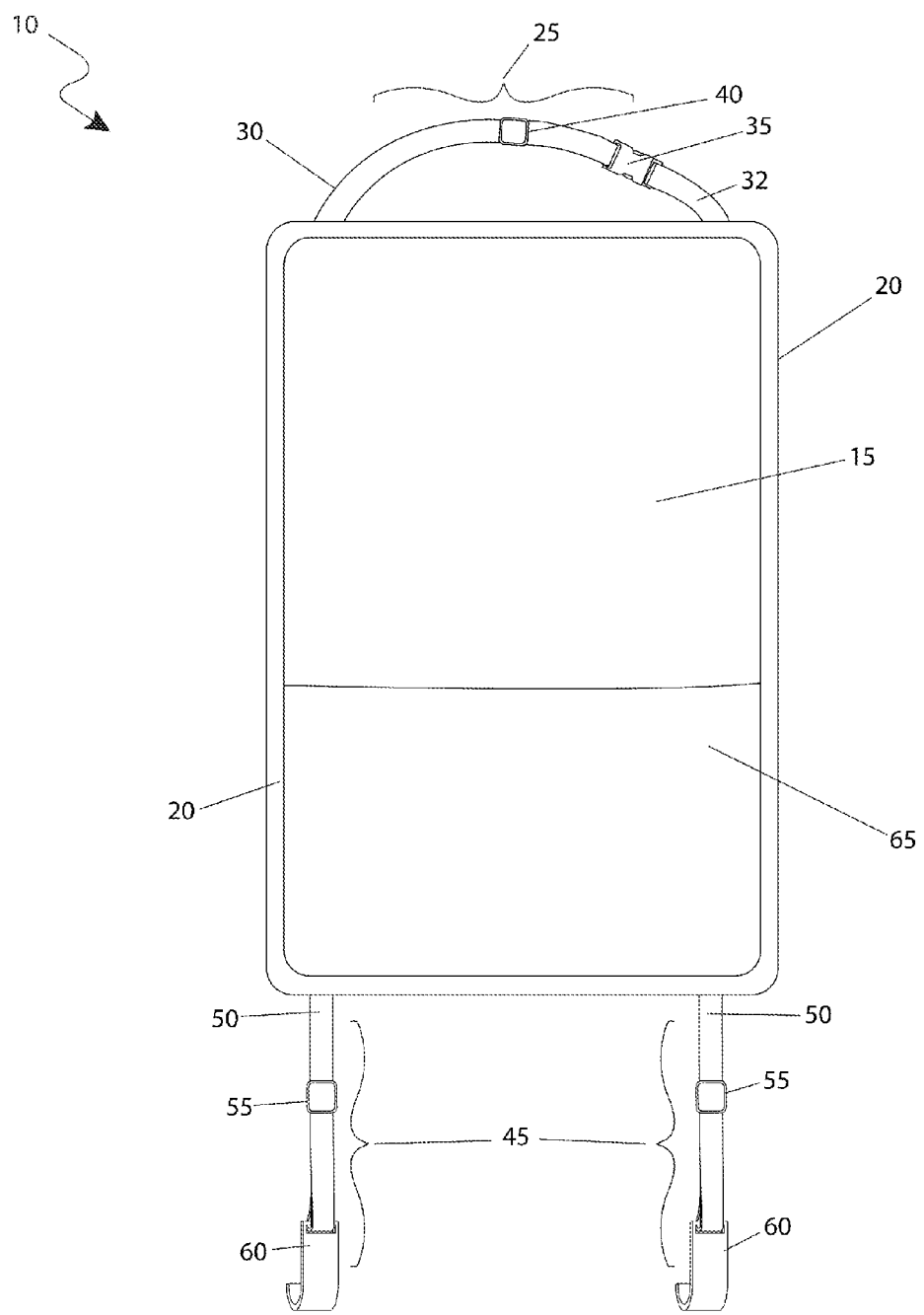
FIG. 1 is a front view of the protective cover for automobile seat back 10, according to the preferred embodiment of the present invention.
Figure 2:
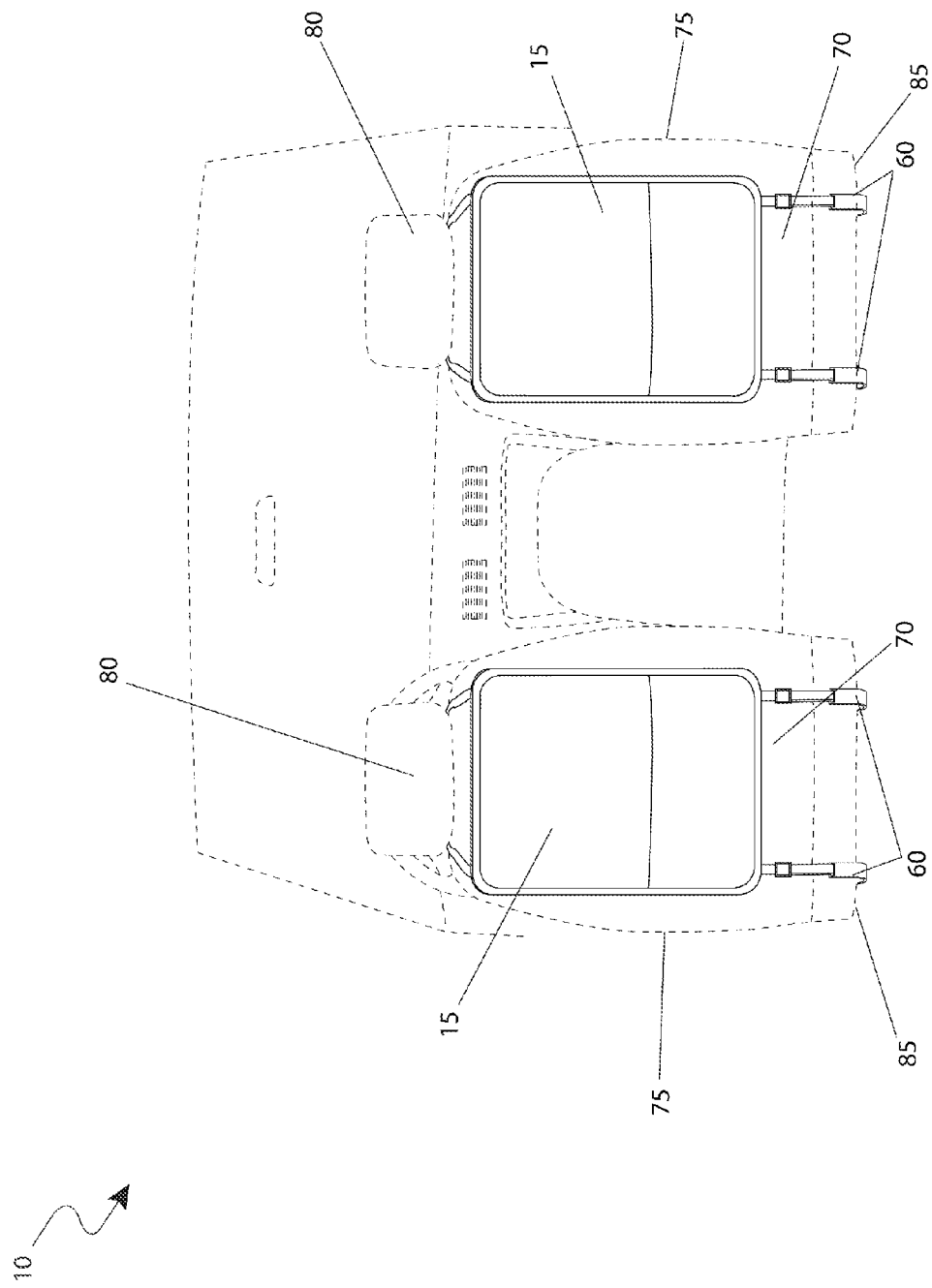
FIG. 2 is an isometric view of the protective cover for automobile seat back 10, shown in an installed position, according to the preferred embodiment of the present invention; and, FIG. 3 is an isometric view of the protective cover for automobile seat back 10, shown in a utilized state, according to the preferred embodiment of the present invention.
Figure 3:
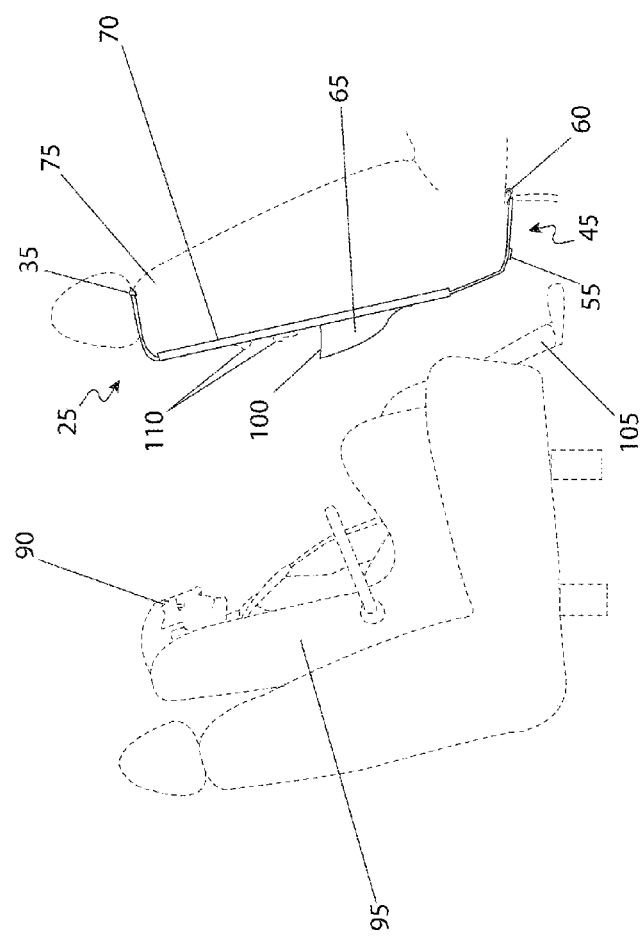

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Referring now to FIG. 1, a front view of the protective cover for automobile seat back 10, according to the preferred embodiment of the present invention, is disclosed. The protective cover for automobile seat back 10 comprises a cover base 15 made of flexible material such as polyvinyl chloride (PVC), although other materials that are flexible and waterproof can be used as well with equal effectiveness, and as such, should not be interpreted as a limiting factor of the present invention. The cover base 15 is approximately seventeen (17) inches wide and twenty (20) inches tall. A binding material 20, such as cotton textile, is provided around the entire perimeter of the cover base 15. The binding material 20 serves as a decorative and physical protection element designed to prevent the cover base 15 from ripping or tearing during use. The protective cover for automobile seat back 10 is supported by an upper securing strap 25 attached to the upper corners of the cover base 15. The upper securing strap 25 comprises a first strap section 30, a second strap section 32, a quick release buckle 35, and a first length adjuster 40. The upper securing strap 25 can be opened, placed around the upper portion of a motor vehicle seat, and closed again by using the quick release buckle 35 to mechanically mate free ends of the first strap section 30 and the second strap section 32.

The quick release buckle 35 comprises two communicating buckle ends further comprises a hollow base member with at least one locking slot attached to the free end of the first strap section and a clasp having at least one deformable tab attached to the free end of the second strap section. The clasp is removably coupled within the hollow base. The quick release buckle 35 is preferably a plastic side release buckle comprising a base having two (2) opposing locking slots on side walls of the base and a clasp having two (2) deformable tabs which engage the two locking slots when the clasp is inserted into the base.

The lower portion of the cover base 15 is secured via two lower securing loops 45. Each lower securing loop 45 consists of a second strap material 50, a second length adjusting means 55, and a hook 60. The hook 60 is used to attach the lower portion of the protective cover for automobile seat back 10 to the bottom of a motor vehicle seat. The hook 60 is preferably a strap hook retainer having a slotted opening in an upper planar end through which a free end of the third strap is looped through and attached. A lower end of the hook 60 comprises an arcuate portion having an angle less the ninety degrees (90°).

Finally, a pocket area 65 is provided over the lower quarter or third of the cover base 15 and stands proud or outward from the cover base 15. In such a manner, any dirt, debris, water, snow, or the like, that is dislodged by the upper portion of the cover base 15 will fall and be captured inside of the pocket area 65. The various components of the protective cover for automobile seat back 10 including the cover base 15, the binding material 20, the first strap material 30, the second strap material 50, and the pocket area 65, would be attached together using conventional sewing methods performed on a heavy duty sewing machine.

The first length adjuster 40 and second length adjuster 55 each comprise a tri-glide slider-type buckle having an inner rung and two outer rungs. A pair of side members interconnects the inner and outer mutually parallel rungs. The first strap section 30 and the pair of third strap sections 50 are each wrapped through the rungs of a corresponding tri-glide buckle, such that each strap section lies atop of the inner rung and under each of the outer rungs. The tri-glide buckle is slidable along a length of the strap section which loops over itself in a commonly known manner, such that the overall length of the strap section is adjustable.

Referring next to FIG. 2, an isometric view of the protective cover for automobile seat back 10, shown in an installed state, according to the preferred embodiment of the present invention is depicted. This figure clearly depicts a set or pair of protective cover for automobile seat back 10 installed on a rear surface 70 of a set of front motor vehicle seats 75. The upper securing strap 25 is secured about a headrest area 80, while each attachment hook 60 is secured to the seat bottom structure 85. In such a manner, the cover base 15 is secured to the rear surface 70 in a tight and form-fitting manner that is not likely to become dislodged while still providing complete coverage. As aforementioned described, the protective cover for automobile seat back 10 would be used in vehicles in which children are placed in rear seat-mounted, but forwardfacing car seats. However, the protective cover for automobile seat back 10 could also be used with children sitting in booster seats or with children sitting directly on the rear seat as well. Such covering afforded by the protective cover for automobile seat back 10 immediately negates the possibility of dirt or physical damage occurring to the rear surface 70 of the front motor vehicle seats 75. Such a feature not only reduces physical activity necessary to clean the rear surface 70, but preserves the quality of the rear surface 70, thus improving re-sale value. The protective cover for automobile seat back 10 would be installed at the same time a car seat is installed, and would remain in place for years while the child progresses through the car seat, a booster seat and direct seating on the rear seat surface. Once a child learns not to kick the rear surface 70, or place his or her feet upon it, the protective cover for automobile seat back 10 would no longer be needed. Should a car be sold or the functionality of the protective cover for automobile seat back 10 no longer be needed, the protective cover for automobile seat back 10 can be easily removed and installed in another vehicle if needed without leaving any tell-tale marks behind. It should be noted that the protective cover for automobile seat back 10 can be used with any type of motor vehicle in which a car seat can be utilized. A listing of such vehicles is envisioned to include automobiles, trucks, vans, busses, SUV's, and the like.

Referring finally, to FIG. 3, an isometric view of the protective cover for automobile seat back 10, shown in a utilized position, according to the preferred embodiment is shown. This view more clearly depicts the physical protection provided by the protective cover for automobile seat back 10 from an occupant 90 in a rear car seat 95. The pocket area 65 provides for a downward protruding opening 100 that would be directly below the feet 105 of the occupant 90. As such, foreign material 110, such as dirt, water, mud, snow or other undesired material, remains on the surface of the cover base 15 or falls into the pocket area 65. The foreign material 110 can be easily wiped off with a damp cloth for cleaning purposes. With the protective cover for automobile seat back 10 in place, the rear surface 70 of the front motor vehicle seats 75 is also protected from scuff marks and abrasions that may occur when the occupant 90 of the rear car seat 95 puts their feet 105 on the rear surface 70. While intended for use with rear car seat 95, the protective cover for automobile seat back 10 can also be used by children who may be sitting in booster seats or sitting in the regular vehicle seat as well and as such, should not be interpreted as a limiting factor of the present invention.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. It is envisioned that the protective cover for automobile seat back 10 would be constructed in general accordance with FIG. 1 through FIG. 3.

The protective cover for automobile seat back 10 would be procured from a manufacturer in its finished state as shown in FIG. 1. It is envisioned that the protective cover for automobile seat back 10 would be made available in multiple colors and styles to match or complement various motor vehicle interiors. The protective cover for automobile seat back 10 would be installed on one or both of the front motor vehicle seats 75, dependent on placement of the rear car seat 95, or occupation of the rear seat by a child depending on need. The quick release buckle 35 would be opened up and the first strap material 30 would be placed around the headrest area 80 of the front motor vehicle seats 75. Next, the first length adjusting means 40 would be adjusted such that the cover base 15 would be positioned in an acceptable position to protect the rear surface 70 of the front motor vehicle seats 75 from accidental contact with the feet 105 of the occupant 90 in a rear car seat 95. Finally, the two (2) lower securing loops 45 would be adjusted in length using the second length adjusting means 55 and the attachment hook 60 would be attached to the seat bottom structure 85 to adequately hold the protective cover for automobile seat back 10 in physical contact with the front motor vehicle seats 75. At this point in time, the protective cover for automobile seat back 10 is ready for operation.

During use of the protective cover for automobile seat back 10, the user would place the child occupant 90 in a rear car seat 95 or directly on the rear seat of the subject motor vehicle. The occupant 90 would be fastened and secured in the normal and expected manner. At this point in time, the protective cover for automobile seat back 10 would provide physical protection against foreign material 110 from directly contacting the rear surface 70. Such damage is envisioned to reduce cleaning, as well as to prevent permanent physical damage to the rear surface 70. Any foreign material 110 that is dislodged from the feet 105 of the occupant 90 during accidental or intentional contact with the cover base 15 would fall into the pocket area 65 and thus keep the floor of the passenger compartment cleaner as well. Should the foreign material 110 on become excessive, the user can wipe the protective cover for automobile seat back 10 off using a damp rag or other conventional cleaning techniques. Additionally, foreign material 110 captured inside of the pocket area 65 can be removed via vacuuming or by wiping with a damp cloth as well. Such usage of the protective cover for automobile seat back 10 continues until no longer needed or require, whereupon it is removed by opening the quick release buckle 35 and unhooking the two (2) attachment hooks 60.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A protective cover for a vehicle seat back comprising:
a generally flexible rectangular base suitably sized to cover an entire rear surface of a vehicle seat;
a binding material affixed around a perimeter of said base;
an upper securing strap affixed to upper corners of said base adapted to connect around an upper portion of said vehicle seat;
a pair of lower securing straps affixed to lower corners of said base each comprising a hook disposed at a free end adapted to connect to a lower edge of said vehicle seat; and,
a horizontally elongated flexible pocket extending entirely across a lower exterior portion of said base comprising a wide open top having an outwardly protruding forward edge adapted to collect debris or liquid;
wherein said base further comprises a waterproof material; and, wherein said base further comprises a length of approximately twenty inches and a width of approximately seventeen inches.

2. The cover of claim 1, wherein said binding material further comprises a textile fabric to protect exterior edges of said base.

3. The cover of claim 2, wherein said binding material further comprises a decorative border.

4. The cover of claim 1, wherein said upper securing strap comprises:
a first strap section comprising a fixed end attached to one of said upper base corners and a free end;
a second strap section comprising a fixed end attached to an opposing one of said upper base corners and a free end;
a means to releasably connect said first strap section free end and said second strap section free end; and,
a length adjuster to adapt a length of said first strap section.

5. The cover of claim 4, wherein said means to releasably connect further comprises a quick release buckle;
wherein said quick release buckle further comprises a hollow base member with at least one locking slot attached to said first strap section free end and a clasp having at least one deformable tab attached to said second strap section free end;
wherein said clasp is removably coupled within said hollow base.

6. The cover of claim 4, wherein said means to releasably connect further comprises a side release buckle;
wherein said side release buckle further comprises a hollow base member with two opposing locking slots in side walls of said base attached to said first strap section free end and a clasp having a pair of opposing deformable tabs attached to said second strap section free end;
wherein said pair of deformable tabs releasingly engage said two locking slots when said clasp is inserted into said base.

7. The cover of claim 4, wherein said length adjuster further comprises a tri-glide slider having one inner and two outer mutually parallel rungs through which a portion of said first strap section is wound.

8. The cover of claim 1, wherein each of said pair of lower securing straps further comprises:
a third strap section comprising a fixed end attached to said base lower corner and said free end opposite said affixed end; and,
a length adjuster to adjust a length of said third strap section.

9. The cover of claim 8, wherein said length adjuster further comprises a tri-glide slider having one inner and two outer mutually parallel rungs through which a portion of said first strap section is wound.

10. The cover of claim 8, wherein said hook further comprises:
a planar base having a slotted aperture through which said third strap section free end is inserted and attached; and,
an arcuate end configured to hookingly engage said lower portion of said vehicle seat.

11. A protective cover for a vehicle seat back comprising:
a generally rectangular base comprising a flexible and waterproof material suitably sized to cover an entire rear surface of a vehicle seat;
a binding material comprising a textile fabric affixed around a perimeter of said base to protect exterior edges of said base;
an upper securing strap adapted to connect to an upper portion of said vehicle seat comprising:
a first strap section comprising a fixed end attached to one upper corner of said base and a free end;
a second strap section comprising a fixed end attached to an opposing one upper corner of said base and a free end;
a quick release buckle further comprising a hollow base member with two opposing locking slots in side walls of said base attached to said first strap section free end and a clasp having a pair of opposing deformable tabs attached to said second strap section free end, wherein said pair of deformable tabs releasingly engage said two locking slots when said clasp is inserted into said base; and,
a first length adjuster further comprising a tri-glide slider having one inner and two outer mutually parallel rungs through which a portion of said first strap section is wound to adapt a length of said first strap section;
a pair of lower securing straps to connect to said vehicle seat, each comprising:
a third strap section comprising a fixed end attached to a lower corner of said base and a free end;
a second length adjuster further comprising a tri-glide slider having one inner and two outer mutually parallel rungs through which a portion of said third strap section is wound to adapt a length of said third strap section; and,
a hook further comprising a planar base having a slotted aperture through which said third strap section free end is inserted and attached and an arcuate end configured to hookingly engage a lower portion of said vehicle seat; and,
a horizontally elongated flexible pocket extending entirely across a lower exterior portion of said base comprising two sides and a bottom affixed to said lower exterior portion of said base and a wide open top having an outwardly protruding forward edge adapted to collect debris or liquid;
wherein said base further comprises a length of approximately twenty inches and a width of approximately seventeen inches.

12. A method of protecting a rear surface of a vehicle seat utilizing a protective cover, comprising the steps of:
providing a protective cover for a vehicle seat back comprising a generally flexible rectangular base comprising a waterproof material suitably sized to cover an entire rear surface of to protect a vehicle seat, a binding material affixed around a perimeter of said base, an upper securing strap affixed to upper corners of said cover base; a pair of lower securing straps affixed to lower corners of said base each comprising a hook disposed at a free end, and a horizontally elongated flexible pocket affixed to extending entirely across a lower exterior portion of said base comprising a wide open top having an outwardly protruding forward edge;
positioning said cover base over said entire rear surface of said vehicle seat;
wrapping said upper securing strap around a head rest of said vehicle seat;
engaging said hooks to a lower portion of said vehicle seat;
protecting said vehicle seat rear surface from contact with footwear of a passenger located in a rear seat; and,
collecting debris and liquid from said footwear with said pocket;

wherein said base further comprises a length of approximately twenty inches and a width of approximately seventeen inches.

\* \* \* \* \*